(12) United States Patent
Sen et al.

(10) Patent No.: US 7,474,767 B2
(45) Date of Patent: Jan. 6, 2009

(54) MOTION DETECTION USING MULTI-RESOLUTION IMAGE PROCESSING

(75) Inventors: Liew Tong Sen, Perak (MY); Ho Tatt Wei, Penang (MY)

(73) Assignee: Avago Technologies ECBU IP (Singapore) Pte. Ltd., Singapore (SG)

( * ) Notice: Subject to any disclaimer, the term of this patent is extended or adjusted under 35 U.S.C. 154(b) by 944 days.

(21) Appl. No.: 10/670,894

(22) Filed: Sep. 24, 2003

(65) Prior Publication Data

US 2005/0063598 A1    Mar. 24, 2005

(51) Int. Cl.
G06K 9/00 (2006.01)
G06K 9/36 (2006.01)
G06K 9/46 (2006.01)
H04B 1/66 (2006.01)
H04N 7/12 (2006.01)
H04N 11/02 (2006.01)
H04N 11/04 (2006.01)

(52) U.S. Cl. .............. 382/107; 382/103; 382/240; 382/248; 382/281; 348/398.1; 375/240.19

(58) Field of Classification Search ........... 382/103, 382/107, 209, 240, 248, 278, 281, 302; 348/154, 348/155, 398.1, 403.1, 407.1; 375/240.19
See application file for complete search history.

(56) References Cited

U.S. PATENT DOCUMENTS

| 5,477,272 | A | | 12/1995 | Zhang |
| 5,557,341 | A | * | 9/1996 | Weiss et al. .............. 348/699 |
| 5,583,580 | A | | 12/1996 | Jung |
| 6,141,448 | A | * | 10/2000 | Khansari et al. ........... 382/236 |
| 6,259,613 | B1 | * | 7/2001 | Lee et al. ..................... 363/89 |
| 6,795,578 | B1 | * | 9/2004 | Kotani et al. ............... 382/180 |
| 6,931,145 | B1 | * | 8/2005 | Kroos et al. ................ 382/107 |
| 6,937,773 | B1 | * | 8/2005 | Nozawa et al. ............. 382/243 |
| 7,068,851 | B1 | * | 6/2006 | Berkner ...................... 382/261 |
| 7,099,512 | B2 | * | 8/2006 | Rovati et al. ............... 382/236 |
| 2002/0057736 | A1 | * | 5/2002 | Fuji et al. .................... 375/240 |
| 2002/0186772 | A1 | * | 12/2002 | Li et al. .................. 375/240.18 |
| 2003/0063672 | A1 | * | 4/2003 | Laurent-Chatenet ... 375/240.16 |
| 2004/0136490 | A1 | * | 7/2004 | Edic et al. ....................... 378/4 |
| 2005/0031037 | A1 | * | 2/2005 | Carrasco et al. ........ 375/240.16 |

FOREIGN PATENT DOCUMENTS

EP    0446001    9/1991

(Continued)

OTHER PUBLICATIONS

Friend et al. ("Real-Time Wavelet Based Target Tracking," SPIE vol. 3517, Nov. 1998, pp. 349-355).*

(Continued)

*Primary Examiner*—Yubin Hung (57) ABSTRACT

Motion detection using sub-band image processing. A device has decompose logic that decomposes an input image into composite images that comprise different frequency bands of the input image. The device also has storage coupled to the decompose logic to store composite images as reference images for comparison with a later input image. The device further has comparison logic to compare the composite images with the reference images to produce preliminary motion values for the different frequency bands. The device also has logic to determine a final motion value from the preliminary motion values.

26 Claims, 6 Drawing Sheets

FOREIGN PATENT DOCUMENTS

| | | |
|---|---|---|
| GB | 2307135 | 6/1997 |
| GB | 2327313 | 1/1999 |
| WO | WO 03/001814 | 1/2003 |

OTHER PUBLICATIONS

Toyokura et al. ("Wavelet Coefficients Motion Compensation for Image Sequence Encoding," IEEE Conf. Circuits and Systems, Nov. 24-27, 1998, pp. 53-56).*

DeVore et al. ("Motion Estimation with the Redundant Wavelet Transform," IEEE Int'l Workshop on Digital and Computational Video, Nov. 2002, pp. 53-58).*

Zafar et al. ("Multiscale Video Representation Using Multiresolution Motion Compensation and Wavelet Decomposition," IEEE J. Selected Areas in Communications, V. 11, No. 1, Jan. 1993, pp. 24-35).*

Rosenfeld and Kak: Digital Picture Processing, 2nd ed., vol. 2, 1982, pp. 44-46.*

Friend et al. ("Real-Time Wavelet Based Target Tracking," SPIE vol. 3517, Nov. 1998, pp. 349-355).*

Toyokura et al. ("Wavelet Coefficients Motion Compensation for Image Sequence Encoding," IEEE Conf. Circuits and Systems, Nov. 24-27, 1998, pp. 53-56).*

DeVore et al. ("Motion Estimation with the Redundant Wavelet Transform," IEEE Int'l Workshop on Digital and Computational Video, Nov. 2002, pp. 53-58).*

Zafar et al. ("Multiscale Video Representation Using Multiresolution Motion Compensation and Wavelet Decomposition," IEEE J. Selected Areas in Communications, V. 11, No. 1, Jan. 1993, pp. 24-35).*

Rosenfeld and Kak: Digital Picture Processing, 2nd ed., vol. 2, 1982, pp. 44-46.*

* cited by examiner

MOTION DETECTION USING MULTI-RESOLUTION IMAGE PROCESSING

TECHNICAL FIELD

Embodiments in accordance with the present invention relate to the field of image processing. Specifically, embodiments in accordance with the present invention relate to detecting motion involving decomposing images into multiple frequency bands.

BACKGROUND

Recently, electronic devices have been developed that are able to track the movement of the electronic device by comparing images sampled by the electronic device at different points in time. For example, optical computer mice compare images of a surface that the mouse is moved over to determine motion of the optical mouse.

In one conventional system, the electronic device has a small light-emitting diode (LED) that emits light that reflects light off almost any surface and back to a complimentary metal oxide semiconductor (CMOS) sensor in the electronic device. This produces in a two-dimensional image of a portion of the surface. The CMOS sensor digitizes the two-dimensional image and sends each digitized image to a digital signal processor (DSP), which compares the current image with a previously captured reference image to determine the motion of the electronic device.

Such optical navigation has many advantages, among which are the lack of moving parts that accumulate dirt and suffer mechanical wear and tear of use. Another advantage of an optical mouse is that it does not need a mouse pad, since it is generally capable of navigating upon arbitrary surfaces, so long as they are not optically featureless. Optical navigation works quite well for a variety of surfaces. However, due to the nature of some surfaces, the electronic device tracks well when moved on some directions across the surface, but has difficulty tracking when moved in another direction across the surface.

As optical navigation is based on a comparison of images, repetitive features in a surface can make it difficult to properly compare the images. For example, some optical mice encounter difficulties when operating on some wood grained surfaces. Grainy surfaces may also present problems, depending upon feature size, as well as orientation.

Thus, one problem with conventional methods to detect motion using image processing methods is the difficulty in working with a wide spectrum of images. Another problem with conventional methods to detect motion using image processing methods is the difficulty in detecting motion with respect to some surfaces.

DISCLOSURE OF THE INVENTION

The present invention pertains to a device to detect motion using sub-band image processing. An embodiment in accordance with the invention is a device having decompose logic that decomposes an input image into composite images that comprise different frequency bands of the input image. The device also has storage coupled to the decompose logic to store composite images as reference images for comparison with a later input image. The device further has comparison logic to compare the composite images with the reference images to produce preliminary motion values for the different frequency bands. The device also has logic to determine a final motion value from the preliminary motion values.

BRIEF DESCRIPTION OF THE DRAWINGS

The accompanying drawings, which are incorporated in and form a part of this specification, illustrate embodiments according to the invention and, together with the description, serve to explain the principles of the invention.

DETAILED DESCRIPTION OF THE INVENTION

In the following detailed description of embodiments of the present invention, numerous specific details are set forth in order to provide a thorough understanding of the present invention. However, embodiments of the present invention may be practiced without these specific details or by using alternative elements or methods. In other instances well known methods, procedures, components, and circuits have not been described in detail as not to unnecessarily obscure aspects of the present invention.

Embodiments in accordance with the present invention detect motion of a device moved across a surface for which detecting differences between features is difficult for conventional techniques. For example, embodiments of the present invention are able to filter out repetitive information that could interfere with accurately determining motion of an optical mouse moved across a surface if the repetitive information were not removed.

Figure 1:
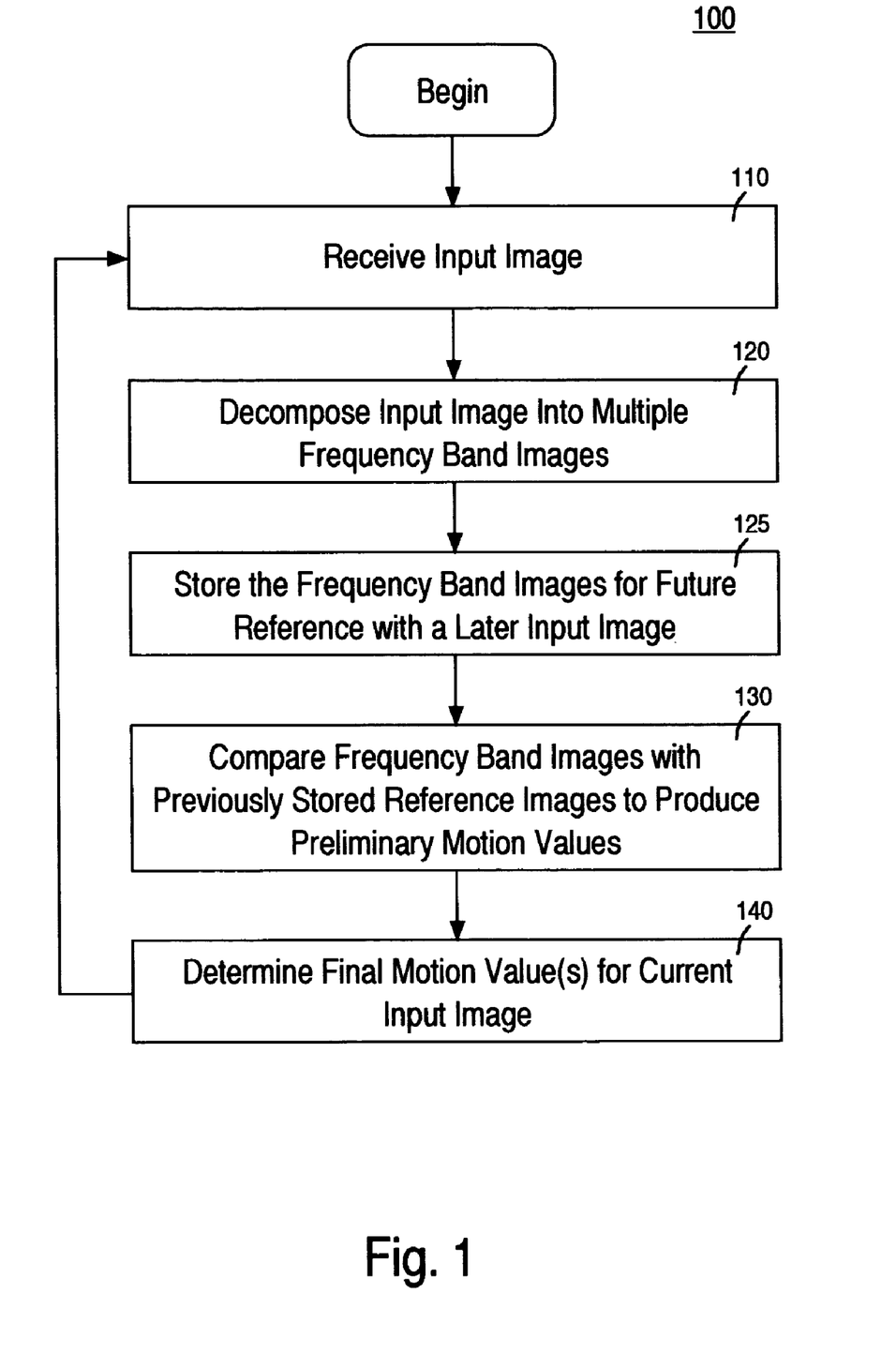
FIG. 1 is a flowchart illustrating a process of motion detection by decomposing images into frequency bands, in accordance with an embodiment of the present invention.

FIG. 1 is a flowchart illustrating a process 100 of detecting motion by breaking images into frequency bands. Steps of process 100 may be stored as instructions on a computer readable medium and executed on a general-purpose processor coupled thereto by a bus. In step 110, an input image is received. However, process 100 is not so limited. In one embodiment in accordance with the present invention, the input image is received from a CMOS sensor by a digital signal-processing component of an optical mouse. However, the present invention is not so limited.

In step 120, the input image is decomposed into multiple frequency band images. Each frequency band image contains a portion of the frequency information of the input image for a range of frequencies. In general, the frequency band images each focus on a separate range of frequencies. However, there may be some overlap in frequencies between two or more of the frequency band images. For example, the nature of the image decomposition may not transform the input image into the ideal frequency band. Moreover, the present invention is not precluded from deliberately having overlap in the frequency band of two or more frequency band images.

The minimum number of frequency band images is two. The maximum is not limited to any number. The number of frequency band images into which the input image is decomposed typically affects the results of the final motion detection. The results typically improve with a greater number of frequency band images, at least if only a few are used. Therefore, the number of frequency band images into which the input image is decomposed may be selected to achieve desired results.

In step 125, the frequency band images are stored for use as reference band images in a later iteration of process 100. For example, the reference band images are used when processing the next input image received in step 110. For each frequency band image produced in step 120, there is a corresponding reference frequency band image that contains information from the input image for the same frequency band.

In step 130, the frequency band images produced in step 120 are compared to reference frequency band images that were stored in step 125 of a previous iteration of process 100. For example, each frequency band image is compared to the corresponding reference frequency band image having the same range of frequency information. The comparison may be a cross-correlation, but the present invention is not so limited.

Although the images are separated by frequency, the images are processed in step 130 in the spatial domain (e.g., by cross-correlation), in some embodiments of the present invention. However, the invention is not be limited to processing in the spatial domain. In some embodiments in accordance with the invention, the processing in step 130 is performed by other cross-correlation or non-cross-correlation methods in the frequency domain. In other embodiments in accordance with the invention, the processing in step 130 is performed by cross-correlation or non-cross-correlation methods in the spatial-frequency domain.

The result of the comparison of step 130 is a set of preliminary motion values. In one embodiment, a motion value comprises a change in an "x" and a "y" coordinate. There may be one or more such motion values generated for each of the comparisons. However, the present invention is not limited to the motion values being changes in "x" and "y" coordinate values.

In step 140, a final motion value is determined from the preliminary motion values. For example, the preliminary motion values may be summed with selected motion values given more weight than others, but the present invention is not so limited. By giving greater weight to certain frequencies, greater or less emphasis is placed on a certain frequency range. For example, it may be determined that a certain frequency range may contain information that is more or less useful in determining motion.

Moreover, by placing less emphasis on a certain frequency band, repetitive information may be removed. This allows tracking to be based on fewer, more prominent features. Further, the weighting is based on the direction of motion or based on surface properties such as fineness of the grain, in embodiments in accordance with the present invention. For example, a frequency band which works well or poorly for the x-direction may not work well or poorly for the y-direction. This may be due to a factor such as grain typically running in a certain direction on a desk or depend on how close the grains are spaced on the desk, although there may be other factors as well. Thus, the weighting for the changes in x-values is different from the weighting for the changes in y-values, in an embodiment in accordance with the present invention. The amount of weighting is predetermined in one embodiment; however, the present invention is not so limited. In another embodiment, the weighting is dynamically determined during optical navigation by statistical processing of the previous images. The process 100 then returns to step 110 to process another input image.

Figure 2:
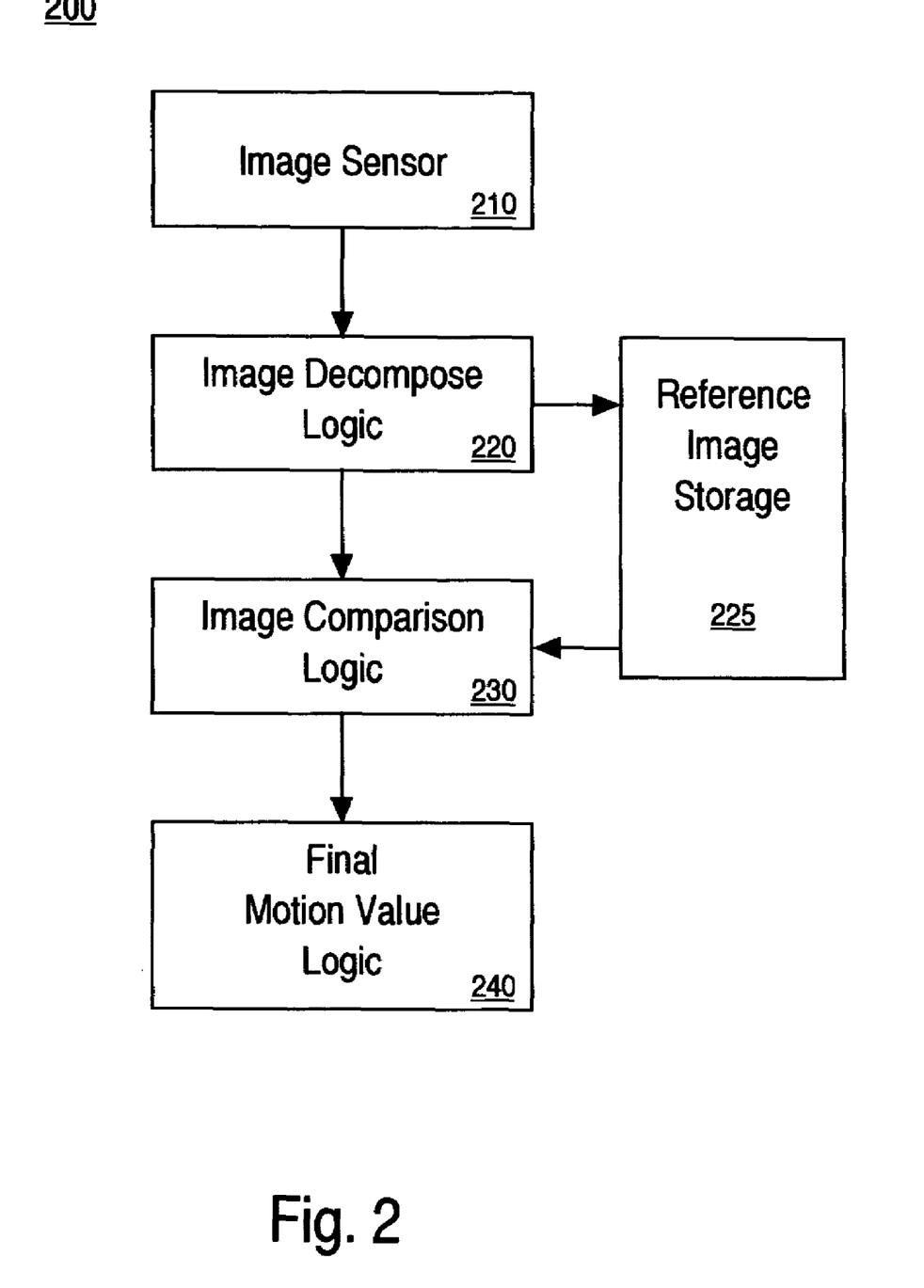
FIG. 2 is a block diagram illustrating a system for detecting motion by decomposing images into frequency bands, in accordance with an embodiment of the present invention.

FIG. 2 is a block diagram illustrating a system 200 for detecting motion by decomposing an image into frequency bands, in accordance with an embodiment of the present invention. The system 200 includes an image sensor 210. In one embodiment in accordance with the present invention, the image sensor 210 is a CMOS sensor. However, the present invention is not so limited.

The image sensor 210 sends images to the image decompose logic 220. Throughout this application, the image decompose logic 220 may also be referred to as transform logic. The image decompose logic 220 decomposes the images into frequency band images. Each frequency band image contains a portion of the frequency information of the input image for a range of frequencies. The image decompose logic 220 sends the frequency band images to the reference image storage 225 for use when processing a later input image. Further, the image decompose logic 220 sends the frequency band images to the image comparison logic 230.

The image comparison logic 230 performs a comparison of the frequency band images from the image decompose logic 220 with the reference images from the reference image storage 225. The output of the image comparison logic 230 is a motion value for each comparison. This results in a motion value for each frequency band. It will be understood that a motion value may be expressed in terms of, for example, an x-coordinate and a y-coordinate.

The motion value logic 240 inputs the motion values from the image comparison logic 230 and computes a final motion value therefrom. The final motion value is output from the motion value logic.

In one embodiment in accordance with the invention, the image decompose logic 220 is implemented with a filter bank. A filter bank embodiment will be discussed in more detail with respect to FIG. 3. In another embodiment in accordance with the invention, the image decompose logic 220 is capable of performing a Discrete Wavelet Transform. One embodiment of the present invention is a redundant Discrete Wavelet Transform, in which down-sampling is not performed. However, embodiments of the present invention are well-suited to all implementations of the Discrete Wavelet Transform and its variants. A Discrete Wavelet Transform embodiment will be discussed in more detail with respect to FIG. 4.

The comparison logic 230 is capable of performing a cross-correlation in one embodiment, but the present invention is not so limited. The present invention is not limited to processing in the spatial domain. In some embodiments in accordance with the invention, the comparison logic 230 is capable of performing other cross-correlation or non-cross-correlation methods in the frequency domain.

The various logic in FIG. 2 may be implemented in an application specific integrated circuit, in one embodiment. In another embodiment, the image comparison logic 230, the image decompose logic 220, and the motion value logic 240 are implemented by a processor executing instructions stored on a computer readable medium.

Figure 3:
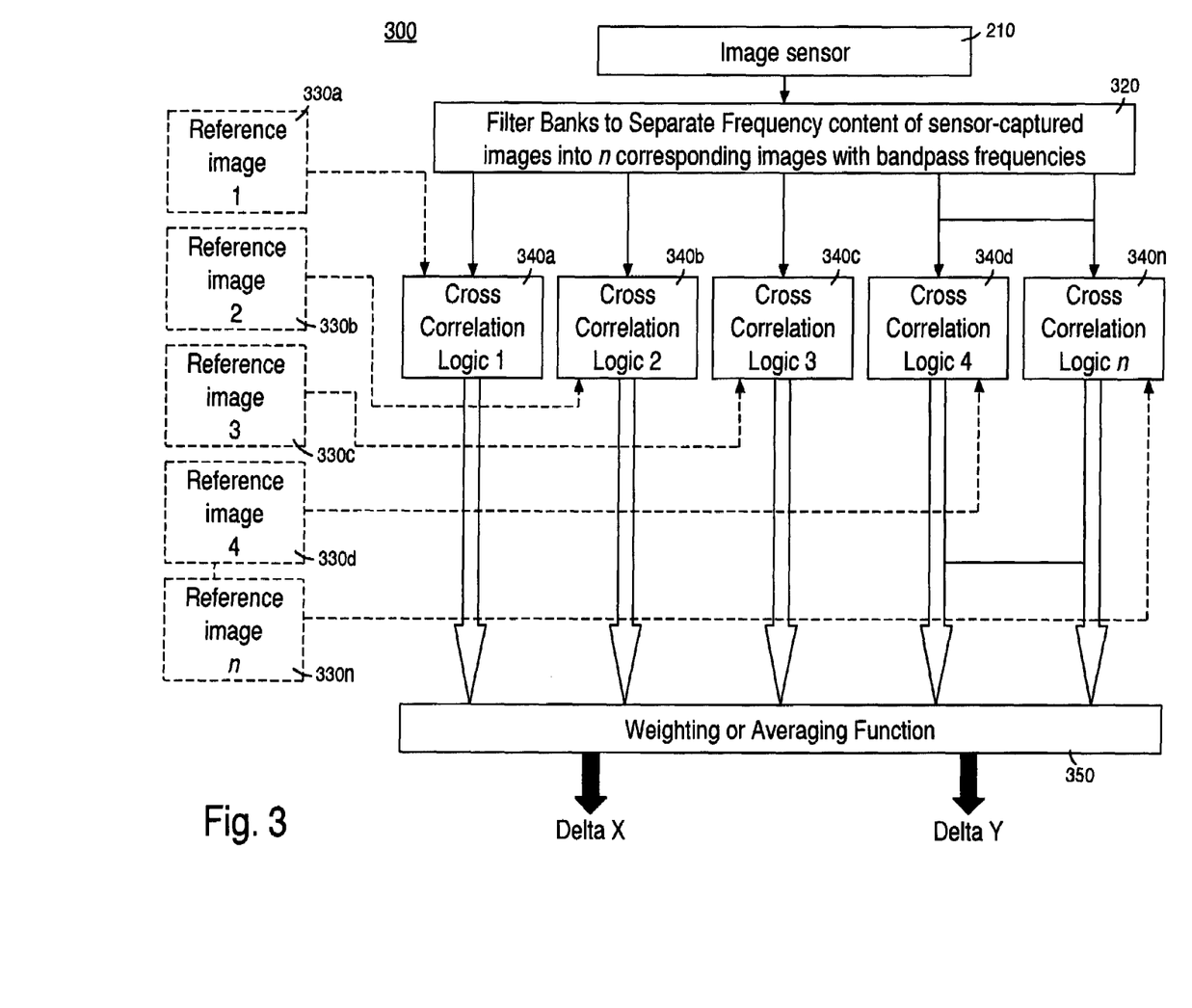
FIG. 3 is a block diagram illustrating a system for detecting motion by decomposing images into frequency bands with a filter bank, in accordance with an embodiment of the present invention.

FIG. 3 is a flow diagram illustrating a system 300 for detecting motion by decomposing images into frequency bands, in accordance with an embodiment of the present invention. In the embodiment of FIG. 3, a filter bank 320 is used to decompose the input image; however, the present invention is not limited to this technique for decomposing the input image. The system 300 includes an image sensor 210, which digitizes and sends an input image to the filter bank 320. In one embodiment in accordance with the present invention, the image sensor 210 is a CMOS sensor. However, the present invention is not so limited.

The filter banks 320 are used decompose the input image into frequency band images in this embodiment. The filters may include a low-pass filter, a high-pass filter, and band-pass filters. The present invention is not limited to any particular combination of filters. Thus, it is not required that there be a low-pass filter, or a band-pass filter, or a high-pass filter. This embodiment of the present invention filters the input image into at least two frequency band images (not depicted in FIG. 3) that contain different frequency information. There is no maximum number of frequency band images. FIG. 3 depicts the filter banks 320 generating "n" frequency band images.

The filter bank 320 sends it output to cross-correlation logic 340a-n. Each of the "n" frequency band images is compared to its corresponding reference frequency band image 330a-n by performing a cross-correlation, in this embodiment. Thus, there are "n" cross-correlations 340a-n depicted in FIG. 3. The cross correlation is performed on a subset of the pixels, in embodiments in accordance with the invention. Computation time is saved and the circuitry may be less complex by performing the cross-correlation on a subset of the pixels in the image. The results of the cross-correlation are motion values for each comparison. The motion values describe the difference in physical location between the current input image and the reference image. Thus, the motion values describe how far an optical mouse that captured the images has been moved by a user between the time the reference image and the current image were captured, in an optical mouse embodiment.

A weighting or averaging function 350 produces a final motion value, based on the preliminary motion values. In this embodiment, the final motion value comprises a delta-x and a delta-y value. In one embodiment, the delta-x and delta-y values are determined by weighting or averaging the preliminary delta-x and delta-y values. However, the present invention is not so limited.

As mentioned above, in another embodiment in accordance with the present invention, an input image is decomposed into frequency band images by recursively applying a Discrete Wavelet Transform. Discrete wavelet transform are known to those of ordinary skill in the art. This is followed by quantization by thresholding. However, the quantization by thresholding is not a required feature of the present invention. Then, the frequency band images are cross-correlated with reference frequency band images to produce preliminary motion values. The preliminary motion values may be weighted or averaged to produce final motion values, but the present invention is not so limited.

Figure 4:
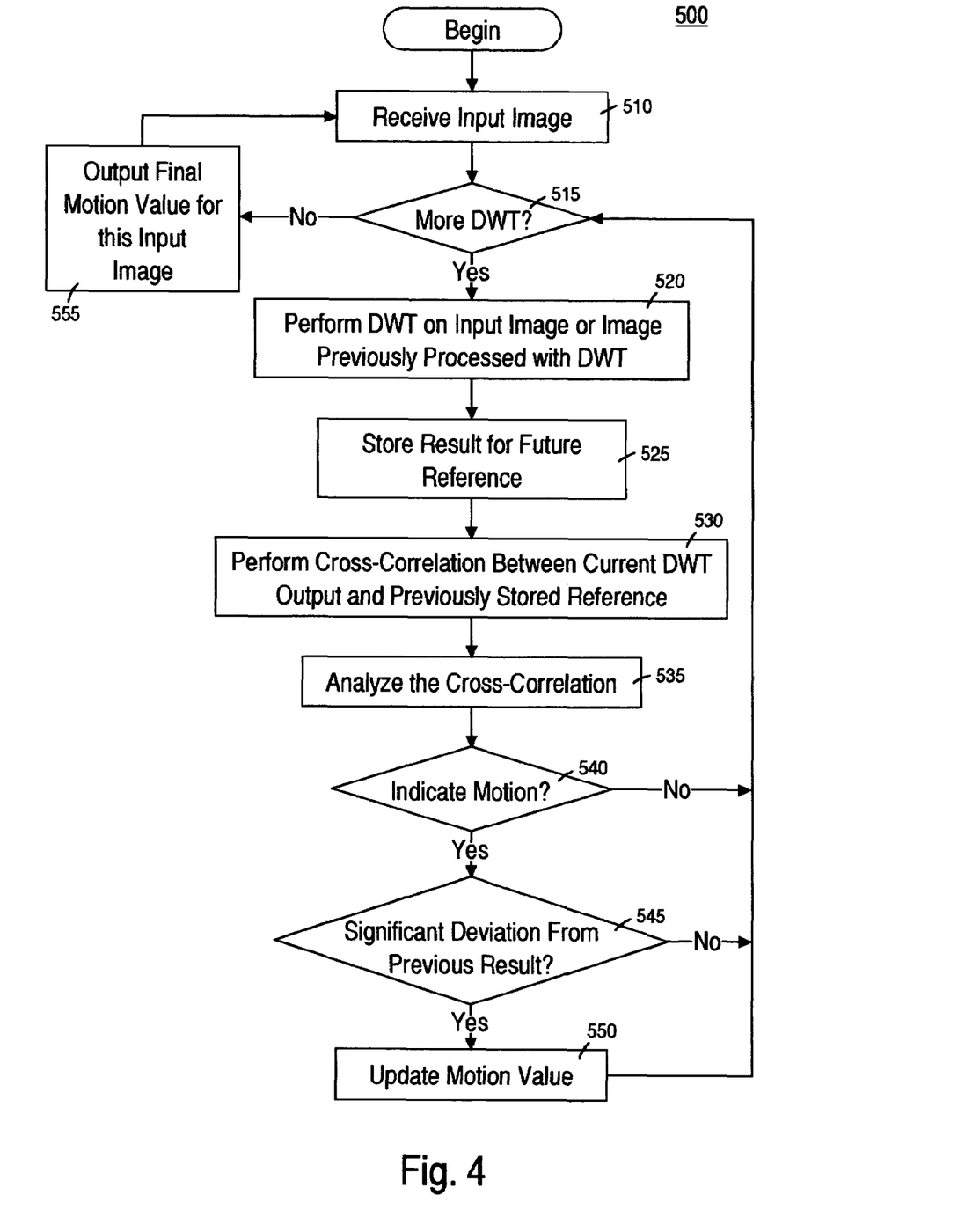
FIG. 4 is a flowchart illustrating a process of detecting motion by decomposing images into frequency bands using a Discrete Wavelet Transform, in accordance with an embodiment of the present invention.

FIG. 4 is a flowchart illustrating a process of detecting motion by decomposing images into frequency bands with a redundant Discrete Wavelet Transform, in accordance with an embodiment of the present invention. A redundant Discrete Wavelet Transform is a Discrete Wavelet Transform performed without down-sampling. In step 510, an input image is received. The image may have been captured by a CMOS sensor, but the present invention is not so limited.

Step 515 is the beginning of a loop for performing a Discrete Wavelet Transform a pre-determined number of times. The loop is exited after the Discrete Wavelet Transform has been performed the pre-determined number of times. The Discrete Wavelet Transform can be performed with many different sets of filter coefficients depending on the type of "wavelet" used. The type of wavelet used determines how the frequency bands are extracted from the image. Embodiments of the present invention are well-suited to all sets of filter coefficients. Moreover, embodiments of the present invention are well-suited to all methods or algorithms of implementing the Discrete Wavelet Transform.

In step 520, a Discrete Wavelet Transform is performed on the input image or an image that was previously processed by a Discrete Wavelet Transform, depending on which iteration of the loop is being performed. Each additional Discrete Wavelet Transform decomposes different frequency information from the input image. However, each time the Discrete Wavelet Transform is performed, the same filter coefficients may be used. This greatly simplifies the process versus techniques that use different sets of filter coefficients to extract different frequency information. For example, pipelining is greatly facilitated and circuitry for executing the process is simpler.

In step 525, the results of the Discrete Wavelet Transform from step 520 are stored for use as a future reference image. For example, the reference image is used when processing the next input image received in step 510.

In step 530, a cross-correlation is performed between the current Discrete Wavelet Transform output and a previously stored reference image from a previous input image.

In step 535, the result of the cross-correlation is analyzed. Step 540 is a test to determine if the result of the current cross-correlation indicates motion. If it does not, then the process 500 returns to step 515 to perform another Discrete Wavelet Transform. If motion is indicated by the results of the cross-correlation, then the process 500 continues on to step 545.

Step 545 is a test to determine if the result of step 535 indicates a significant deviation from the result of step 535 for the previous iteration of the loop. For example, the cross-correlation result of the third Discrete Wavelet Transform with its reference image is compared to the cross-correlation result of the second Discrete Wavelet Transform with its reference image. If the current cross-correlation result does not deviate significantly from the previous cross-correlation result, then the process 500 returns to step 515. If there is not a significant deviation, there is not a need to update the motion values. The term "significant deviation" in this context is meant to be flexible in that what is deemed significant may be determined for the particular application in which process 500 is practiced. If there is a significant deviation in the cross-correlation, then the process 500 goes on to step 550 to update the motion values.

Determining if there is a significant deviation in the results allows repetitive features to be removed. For example, if the third cross-correlation result is significantly different from the second cross-correlation result, it may indicate that the second cross-correlation result was affected by repetitive information. The second cross-correlation may have been affected because of the frequency content of its input images, given the nature of the surface for which the images were captured, and the velocity and direction of motion. Therefore, the results from the second cross-correlation are disregarded. If the result of the third Discrete Wavelet Transform is significantly different from the result of the second Discrete Wavelet Transform, then the results of the third Discrete Wavelet Transform are stored as the correct motion values in step 550. In one embodiment, a register containing motion values is updated by overwriting previous motion values.

After updating the motion values in step 550, the process returns to step 515. If the Discrete Wavelet Transform is to be performed again, the process continues at step 520. Otherwise, the process 500 goes to step 555 in which the motion values for this input image are output. Then, the process 500 goes to step 505, in which a new input image is received. The process 500 then analyzes this input image, with the reference images stored from analyzing the previous input image serving as the reference images.

Figure 5A:
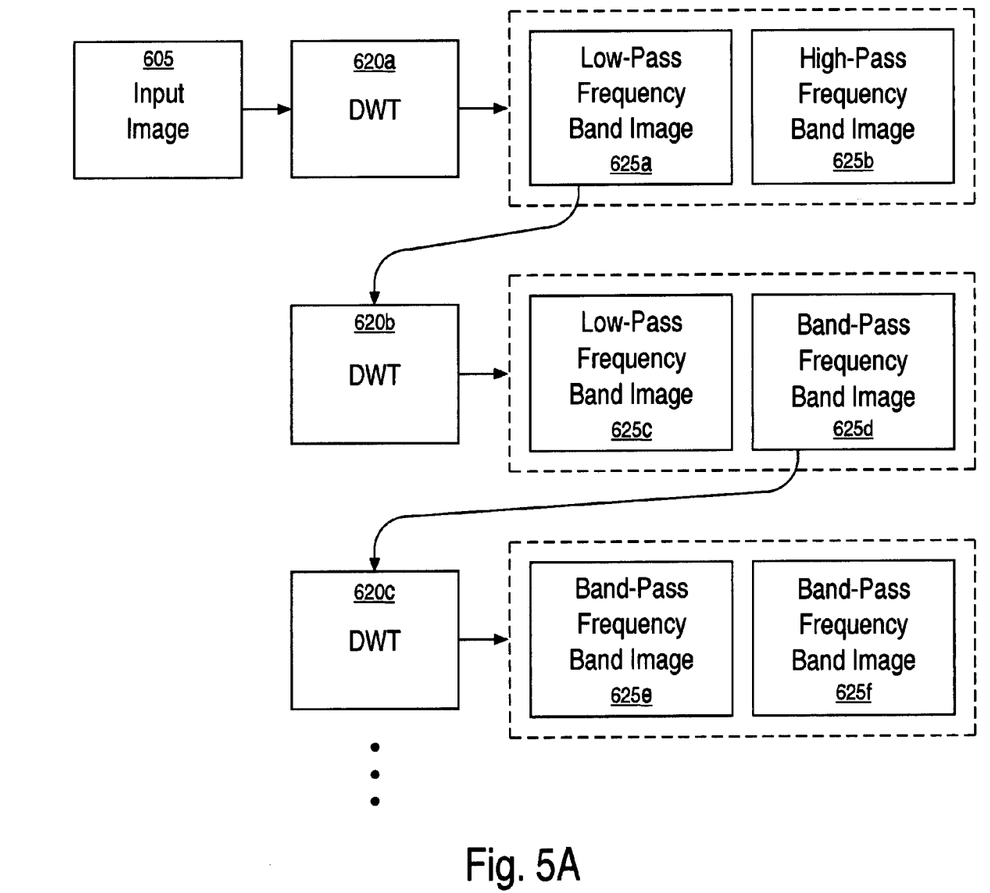
FIG. 5A is a diagram illustrating frequency bands decomposed from an image by an embodiment in accordance with the present invention.

FIG. 5A illustrates an exemplary sequence of Discrete Wavelet Transforms and the frequency band images produced therefrom. It will be understood that the example of FIG. 5A is exemplary and that many other sequence of Discrete Wavelet Transforms are within the scope of the present invention. Each Discrete Wavelet Transform produces two or more frequency band images. In this embodiment, each Discrete Wavelet Transform produces two frequency band images. In this embodiment of the present invention, one of the two frequency band images is further processed by an additional Discrete Wavelet Transform. Each successive application of the Discrete Wavelet Transform extracts a different band of frequency information.

The first application of the Discrete Wavelet Transform 620a to the input image 605 produces a low-pass and a high-pass frequency band image 625a and 625b. In this embodiment, the low pass frequency band image 625a is further processed by the second Discrete Wavelet Transform 620b, which produces another low-pass frequency band image 625c and a band-pass frequency band image 625d. The low-pass frequency band image 625c and the band-pass frequency band image 625d comprise frequency bands within the low-pass pass frequency band image 625a. In this example, the band-pass frequency band image 625d is further processed by the third Discrete Wavelet Transform 620c to produce further band-pass frequency band images 625e and 625f. This process can continue further to extract further frequency information from the input image. Moreover, the frequency band image that is processed by the next Discrete Wavelet Transform can be tailored to extract the frequency information of interest. For example, rather than, or in addition to, the second Discrete Wavelet Transform 620b inputting the low-pass frequency band image 625a, the high-pass frequency band image 625b may be processed.

Figure 5B:
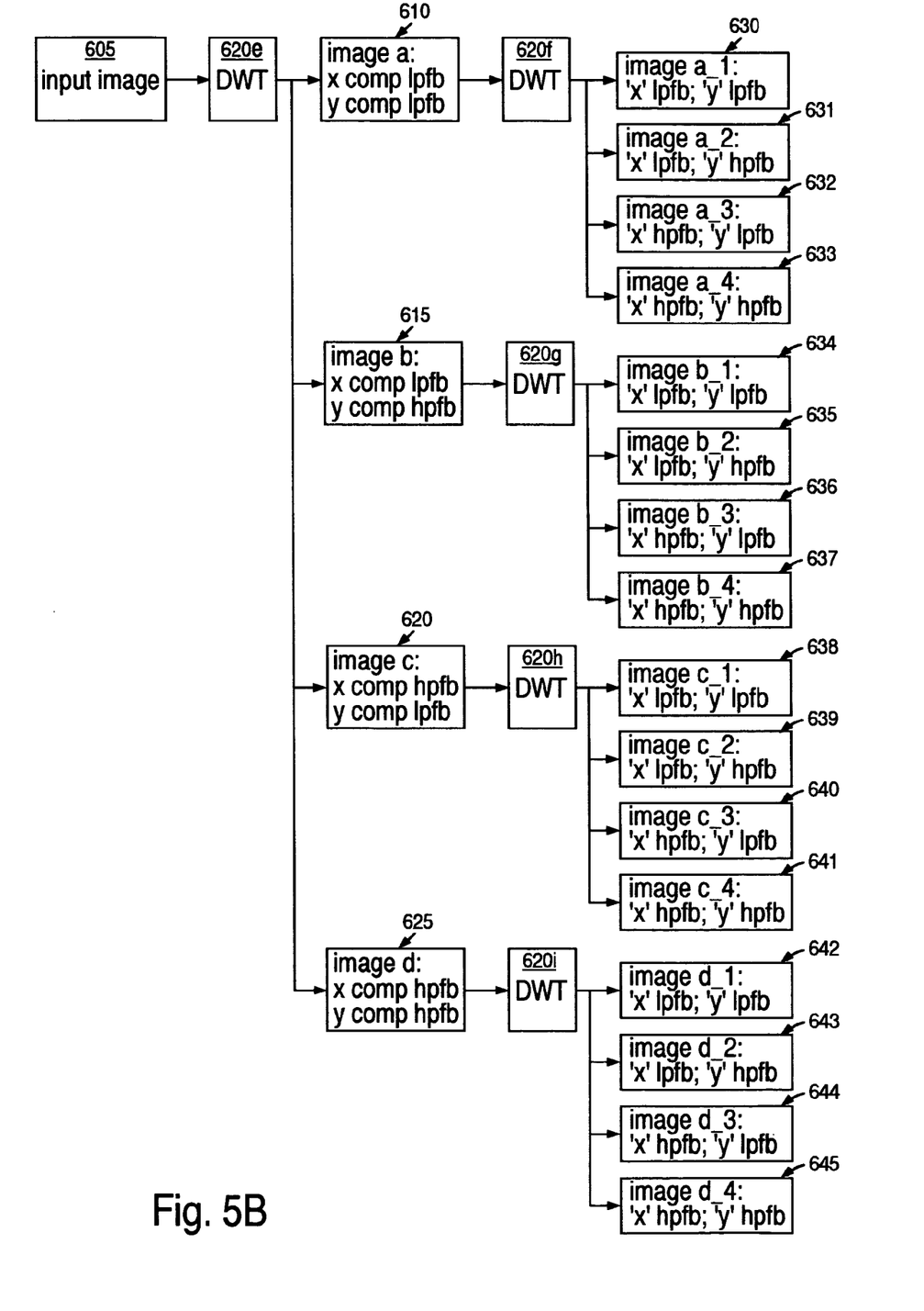
FIG. 5B is a diagram illustrating "x" and "y" component frequency bands decomposed from an image by an embodiment in accordance with the present invention.

It is not unlikely that the surface being scanned has different features in the "x" and "y" directions. For example, a wood grained desk may have grain running in the "x" direction. However, many other possibilities exist to produce variations in the features based on orientation. By producing images in which the "x" and "y" components may comprise different frequency bands, embodiments of the present invention are able to selectively filter information that repeats at a first interval along one of the axes and repetitive information that repeats at a different interval along the other axis. FIG. 5B illustrates an exemplary sequence of Discrete Wavelet Transforms and "x" and "y" component frequency band images produced therefrom. It will be understood that the example of FIG. 5B is exemplary and that many other sequence of Discrete Wavelet Transforms are within the scope of the present invention. Each Discrete Wavelet Transform produces four frequency band images, in this embodiment. In this embodiment of the present invention, the four frequency band images is further processed by four additional Discrete Wavelet Transforms. Each successive application of the Discrete Wavelet Transform extracts a different frequency band of "x" and "y" component frequency band information, in this embodiment.

The first application of the Discrete Wavelet Transform 620e to the input image 605 produces image "a" 610, image "b" 615, image "c" 620, and image "d" 625. Image "a" 610, has an "x" component low-pass frequency band and a "y" component low-pass frequency band. Image "b" 615, has an "x" component low-pass frequency band and a "y" component high-pass frequency band. Image "c" 620, has an "x" component high-pass frequency band and a "y" component low-pass frequency band. Image "d" 625, has an "x" component high-pass frequency band and a "y" component high-pass frequency band. Thus, the four images (610, 615, 620, 625) produced by the first Discrete Wavelet Transform 620e have "x" and "y" components with different frequency bands.

In this embodiment, each of the four images 610, 615, 620, and 625 are processed by an additional Discrete Wavelet Transform 620f-620i, respectively. Each of these additional Discrete Wavelet Transforms produces four images. Thus there are a total of sixteen images 630-645 at this level. It will be understood that the terms "low-pass" frequency band and "high-pass" frequency band in elements 630-645 are relative to the input images 610-625. Thus, Discrete Wavelet Transform 620f inputs image "a" 610 and produces image "a_1" 630 having "x" and "y" component low-pass frequency bands. These low-pass bands are relative to the low-pass frequency band of image "a" 610. As a further illustration, image "a_2" 631 has a "y" component high-pass frequency band. It will be understood that this high-pass frequency band is relative to the low-pass frequency band of image "a" 610. Thus, the process illustrated in FIG. 5B extracts information for which the "x" and "y" component in a given image may have different frequency bands from each other. Thus, the "x" and "y" directions can be processed in such a fashion to handle cases in which features do not repeat at the same interval along the "x" axis as they do along the "y" axis. The process in FIG. 5B can continue further to extract further frequency information from the input image.

It is not required that all the images produced by the DWTs are used. For instance, images 610, 634 and 639 could be selected for further processing, while other images are discarded. Therefore, a subset of images may be selected to work with from the images 610-625 from the initial DWT 620e together with or independent of a subset of images 630-645 from the next level of DWT processing 620f-i. To save on computation, if any image subset of 610-625 is selected their corresponding DWTs do not need to be performed (e.g., the group 620f-620i DWT). For example, in selecting images 610, 634 and 639, only DWT 620e, 620g and 620h need be performed. DWT 620f is not required since the frequency information decomposed by it is already present in image 610. DWT 620i is not required because the decomposed image bands resulting from it are not used in this example.

Embodiments of the present invention may be stored as instructions on a computer readable medium and executed on a general-purpose processor coupled thereto by a bus. However, the present invention is not limited to software implementation. Embodiments of the present invention may be implemented as an application specific integrated circuit. Some embodiments of the present invention are implemented by a combination of hardware and software.

While the present invention has been described in particular embodiments, it should be appreciated that the present invention should not be construed as limited by such embodiments, but rather construed according to the below claims.

What is claimed is:

1. A device for processing an image comprising:
   decompose logic that is operable to decompose a first input image into a plurality of first composite images that comprise different frequency bands of said first input image;
   storage coupled to said decompose logic to store said plurality of first composite images as reference images for comparison with second input image;

comparison logic to compare second composite image obtained from the second input image with said reference images to produce preliminary motion values for said different frequency bands; and logic to determine a final motion value from said preliminary motion values, wherein said logic to determine compares said preliminary motion values from said different frequency bands to determine and eliminate as a candidate for the final motion value preliminary motion values resulted from features repeating at different regularities in the spatial domain.

2. The device of claim 1, wherein said decompose logic performs a redundant Discrete Wavelet Transform.

3. The device of claim 2, wherein said decompose logic performs said redundant Discrete Wavelet Transform to produce images in which an "x" component and a "y" component comprise different frequency bands from each other.

4. The device of claim 3, wherein said decompose logic performs said redundant Discrete Wavelet Transform to produce images in which an "x" component and a "y" component comprise the same frequency bands as each other.

5. The device of claim 2, wherein said decompose logic performs said redundant Discrete Wavelet Transform to produce images in which an "x" component and a "y" component comprise the same frequency bands as each other.

6. The device of claim 1, wherein said logic to determine a final motion value modifies preliminary motion values associated with a frequency band of said different frequency bands, wherein repetitive features are reduced.

7. The device of claim 1, wherein said decompose logic comprises a plurality of filters having different frequency characteristics from each other.

8. The device of claim 1, wherein said comparison logic performs a cross-correlation on a subset of pixels between said second composite images and said reference images.

9. The device of claim 1, wherein each of said motion values comprises an x-motion value and a y-motion value and said logic to determine a final motion value weighs said x-motion value differently from said y-motion value.

10. The device of claim 1, wherein said decompose logic performs a quantization with a pre-determined threshold.

11. An optical navigation system comprising:
an image sensor;
transform logic coupled to the image sensor that is operable to perform a Discrete Wavelet Transform to decompose an input image from said image sensor into a plurality of first composite images that comprise different frequency bands of said input image, wherein said transform logic produces images in which an "x" component and a "y" component comprise different frequency bands from each other, wherein repetitive features in the x-axis or y-axis of said input image are selectively filtered;
storage coupled to said transform logic to store a plurality of first composite images as reference images for comparison with a second input image;
comparison logic to compare second composite image obtained from the second input image with said reference images to produce preliminary motion values for said different frequency bands; and
logic to determine a final motion value from said preliminary motion values, wherein said logic to determine compares said preliminary motion values from said different frequency bands to determine and eliminate as a candidate for the final motion value preliminary motion values resulted from features repeating at different regularities in the spatial domain.

12. The system of claim 11, wherein said transform logic performs a redundant Discrete Wavelet Transform.

13. The system of claim 11, wherein said logic to determine a final motion value attenuates preliminary motion values associated with a frequency band of said different frequency bands, wherein repetitive features are reduced.

14. The system of claim 11, wherein said comparison logic performs a cross-correlation on a subset of pixels between said second composite images and said reference images.

15. The system of claim 11, wherein each of said motion values comprises an x-motion value and a y-motion value and said logic to determine a final motion value weighs said x-motion value differently from said y-motion value.

16. The system of claim 11, wherein said transform logic performs a quantization with a pre-determined threshold.

17. A method of motion detection using multiple frequency band image processing comprising:
receiving an input image;
decomposing said input image into a plurality of composite images that comprise different frequency bands of said input image;
comparing said composite images with reference composite images to produce preliminary motion values for said different frequency bands; and
determining a final motion value from said preliminary motion values, wherein said determining step compares said preliminary motion values from said different frequency bands to determine and eliminate as a candidate for the final motion value preliminary motion values resulted from features repeating at different regularities in the spatial domain.

18. The method of claim 17, wherein said decomposing step comprises recursively performing a Discrete Wavelet Transform.

19. The method of claim 18, wherein said decomposing step produces an image comprising "x" component information having a different frequency band from a frequency band of a "y" component of the image.

20. The method of claim 17, wherein said determining step modifies preliminary motion values associated with a frequency band of said different frequency bands, wherein repetitive features are reduced.

21. The method of claim 17, wherein said decomposing step filters said input image with a plurality of filters having different frequency characteristics.

22. The method of claim 17, wherein said comparison step performs a cross-correlation between said composite images with said reference composite images, wherein said cross-correlation is performed on a subset of pixels.

23. The method of claim 17, wherein said determining step weights said motion values differently to assign greater or less weight to different frequency bands of said frequency bands.

24. The method of claim 23, wherein said determining step dynamically determines weighting values.

25. The method of claim 17, wherein said decomposing step performs quantization with a threshold that is pre-determined.

26. The method of claim 17, wherein said method is performed in an optical mouse.

* * * * *

UNITED STATES PATENT AND TRADEMARK OFFICE
CERTIFICATE OF CORRECTION

PATENT NO. : 7,474,767 B2   Page 1 of 1
APPLICATION NO. : 10/670894
DATED : January 6, 2009
INVENTOR(S) : Sen et al.

It is certified that error appears in the above-identified patent and that said Letters Patent is hereby corrected as shown below:

Column 8, Line 67, Claim 1, after "with" insert --a--.

Signed and Sealed this

Twenty-first Day of December, 2010

David J. Kappos
*Director of the United States Patent and Trademark Office*